(12) United States Patent
Kelly

(10) Patent No.: US 11,422,858 B2
(45) Date of Patent: Aug. 23, 2022

(54) LINKED WORKLOAD-PROCESSOR-RESOURCE-SCHEDULE/PROCESSING-SYSTEM—OPERATING-PARAMETER WORKLOAD PERFORMANCE SYSTEM

(71) Applicant: Dell Products L.P., Round Rock, TX (US)

(72) Inventor: John Kelly, Mallow (IE)

(73) Assignee: Dell Products L.P., Round Rock, TX (US)

( * ) Notice: Subject to any disclaimer, the term of this patent is extended or adjusted under 35 U.S.C. 154(b) by 380 days.

(21) Appl. No.: 16/508,078

(22) Filed: Jul. 10, 2019

(65) Prior Publication Data
US 2021/0011764 A1    Jan. 14, 2021

(51) Int. Cl.
  *G06F 9/46*  (2006.01)
  *G06F 9/48*  (2006.01)
  *G06F 9/50*  (2006.01)

(52) U.S. Cl.
  CPC ............ *G06F 9/4893* (2013.01); *G06F 9/505* (2013.01); *G06F 2209/501* (2013.01); *G06F 2209/508* (2013.01)

(58) Field of Classification Search
  None
  See application file for complete search history.

(56) References Cited

U.S. PATENT DOCUMENTS

| | | | |
|---|---|---|---|
| 2013/0117752 A1* | 5/2013 | Li | G06F 9/5066 718/102 |
| 2014/0108828 A1* | 4/2014 | Breternitz | G06F 9/5094 713/300 |
| 2017/0069054 A1* | 3/2017 | Ramadoss | G06T 1/60 |

* cited by examiner

*Primary Examiner* — Bing Zhao
(74) *Attorney, Agent, or Firm* — Joseph Mencher

(57) ABSTRACT

A workload/processor resource scheduling system is coupled to a processing system. The workload/processor resource scheduling system monitors a performance of first workload(s) by the processing system according to a workload/processor resource schedule, and identifies a correlation between the performance of the first workload(s) according to the workload/processor resource schedule, and an operating level of a processing system operating parameter for the processing system when performing the first workload(s) according to the workload/processor resource schedule. Based on the correlation, the workload/processor resource schedule and the processing system operating parameter are linked. Subsequently, an operating-parameter-based request is received to produce the operating level of the processing system operating parameter when performing a second workload and, based on the operating-parameter-based request and the linking of the workload/processor resource schedule and the processing system operating parameter, the second workload is performed by the processing system based on the workload processor resource schedule.

20 Claims, 8 Drawing Sheets

LINKED WORKLOAD-PROCESSOR-RESOURCE-SCHEDULE/PROCESSING-SYSTEM—OPERATING-PARAMETER WORKLOAD PERFORMANCE SYSTEM

BACKGROUND

The present disclosure relates generally to information handling systems, and more particularly to scheduling the use of processor resources in an information handling system for providing workloads.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems include processing systems that may provide parallel processing capabilities that allow for their use in multiple applications. For example, Graphics Processing Units (GPUs) included on GPU cards in information handling systems may be utilized to perform graphics workloads that may provide for graphics acceleration, as well as non-graphics/general purpose workloads that may provide for Artificial Intelligence (AI) operations, Machine Learning (ML) operations, and/or Deep Learning (DL) operations. One specific example of current graphics workloads provided by GPU cards is the use of computing devices/GPU card by a business to perform graphics acceleration utilized with Virtual Desktop Infrastructure (VDI) environments to provide virtual desktops with enhanced video, animation, and/or other graphics elements in a manner that is desirable to employees and other users in the business (i.e., "smooth" graphics elements that do not "stutter" or otherwise operate in a manner that is not expected by the user.) However, recent GPU card use trends also see those businesses attempting to utilize their GPU cards to perform non-graphics workloads that include the AI operations, ML operations, and/or DL operations discussed above, which allow the GPU cards that provide the VDI environments discussed above to also be utilized to perform the AI operations, ML operations, and DL operations that may include, for example, analytics on customer data, image matching, deep learning for weather forecasting, and/or a variety of other AI operations, ML operations, and/or DL operations known in the art.

As would be appreciated by one of skill in the art, the GPUs on the GPU cards discussed above provide shared resources that are utilized by the workloads they perform, and in such shared resource environments the concept of "noisy neighbors" arises. For example, when multiple workloads contend for shared resources, workloads with high resource requirements operate as noisy neighbors that consume relatively large amounts of the shared resources, which can result in degraded performance of the other workloads. Conventional solutions to noisy neighbor issues include the reservation of resources for particular workloads, anti-affinity rules that prevent multiple high-resource-requirements workloads from being scheduled to use the same resource, and/or other noisy neighbor solutions known in the art. For example, in the case of the use of GPUs for VDI environments and AI/ML/DL operations, the most common approach for dealing with noisy neighbors is the use of GPU scheduling to allow an administrator to distribute the GPU resources between the workloads based on different scheduling options. However, it has been found that the use of such GPU scheduling typically results in the administrator selecting scheduling options in an ad-hoc manner that does not deliver optimal results based on the workload being performed and/or the requirements of the business.

Accordingly, it would be desirable to provide an improved workload/processor resource scheduling system.

SUMMARY

According to one embodiment, an Information Handling System (IHS) includes a processing system; and a memory system that is coupled to the processing system and that includes instructions that, when executed by the processing system, cause the processing system to provide a workload/processor resource scheduling engine that is configured to: monitor a performance of at least one first workload by a processing system according to a workload/processor resource schedule; identify a correlation between: the performance of the at least one first workload according to the workload/processor resource schedule; and an operating level of a processing system operating parameter for the processing system when performing the at least one first workload according to the workload/processor resource schedule; link, based on the correlation, the workload/processor resource schedule and the processing system operating parameter; receive, subsequent to linking the workload/processor resource schedule and the processing system operating parameter, an operating-parameter-based request to produce the operating level of the processing system operating parameter for the processing system when performing a second workload; and cause, based on the operating-parameter-based request and the linking of the workload/processor resource schedule and the processing system operating parameter, the performance of the second workload by the processing system based on the workload processor resource schedule

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
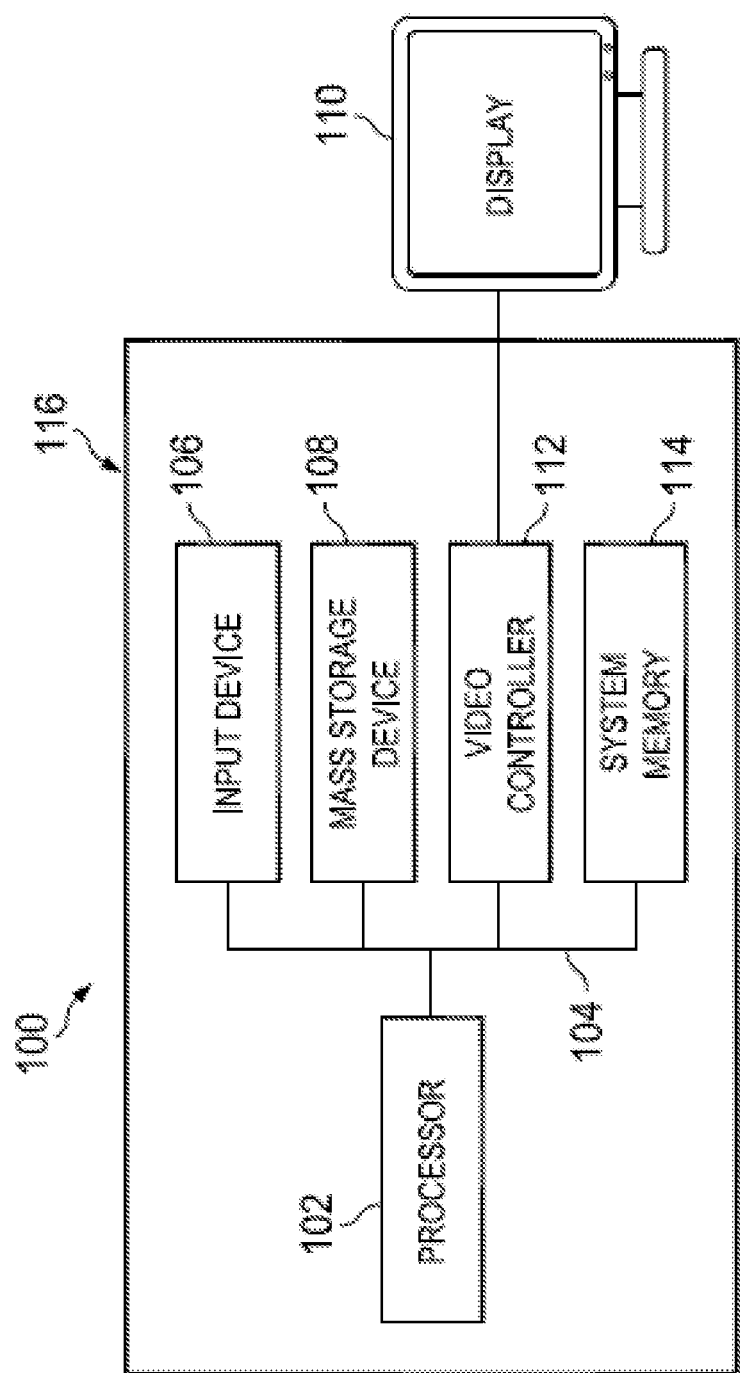
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
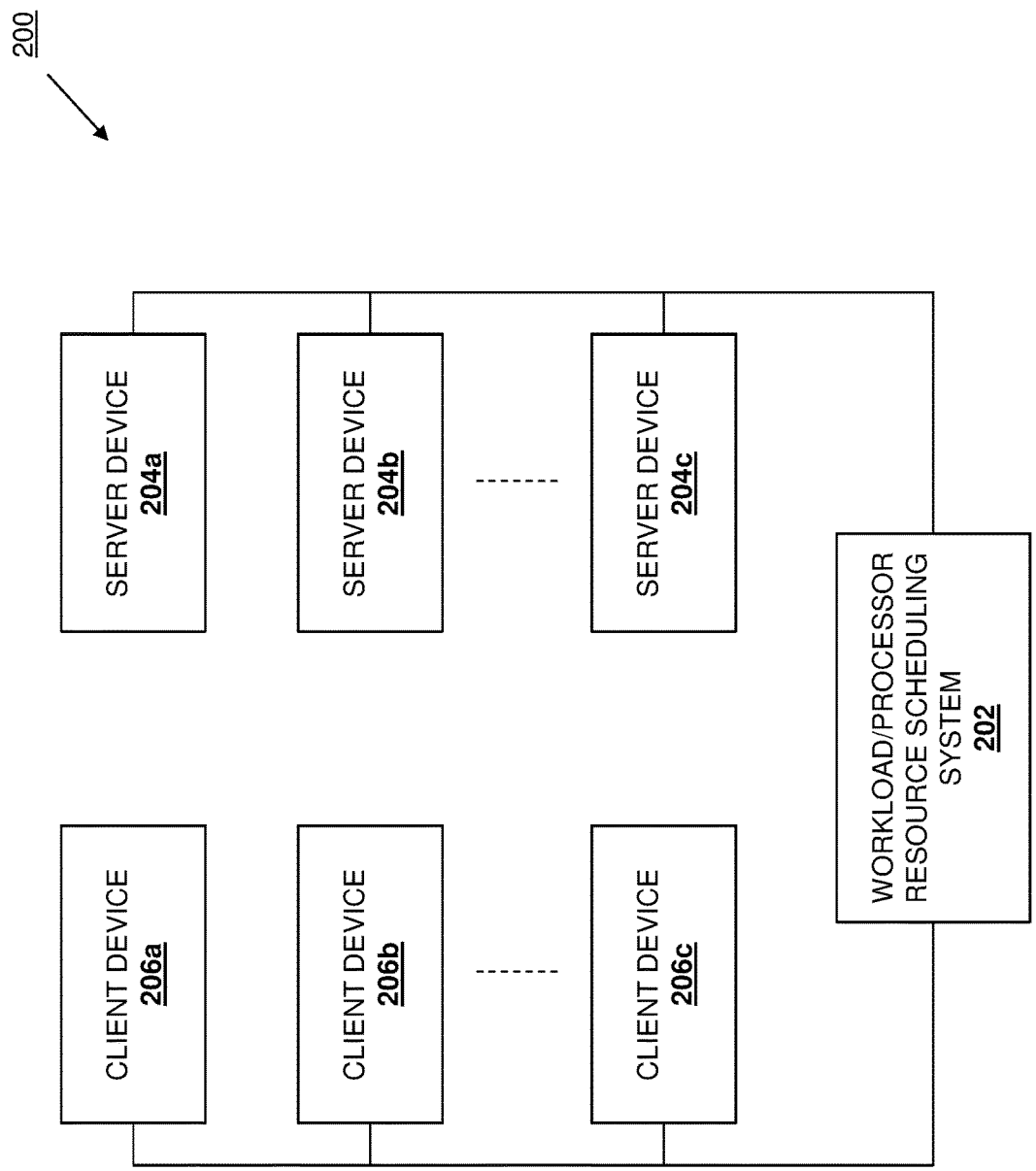
FIG. 2 is a schematic view illustrating an embodiment of a networked system.

Referring now to FIG. 2, an embodiment of a networked system 200 is illustrated. In the illustrated embodiment, the networked system 200 includes a workload/processor resource scheduling system 202. In an embodiment, the workload/processor resource scheduling system 202 may be provided by the IHS 100 discussed above with reference to FIG. 1, and/or may include some or all of the components of the IHS 100. However, while one of skill in the art in possession of the present disclosure will recognize that the workload/processor resource scheduling system 202 is illustrated and discussed as provided by one or more server devices in the examples below, workload/processor resource scheduling systems provided in the networked system 200 may include any devices that may be configured to operate similarly as the workload/processor resource scheduling system 202 discussed below.

In the illustrated embodiment, the networked system 200 also includes a plurality of server devices 204a, 204b, and up to 204c that are coupled to the workload/processor resource scheduling system 202 directly, via a network (e.g., a Local Area Network (LAN), the Internet, a management network, combinations thereof, and/or via any other networks known in the art), and/or in any other manner that would be apparent to one of skill in the art in possession of the present disclosure. Any or all of the server devices 204a-204c may be provided by the IHS 100 discussed above with reference to FIG. 1, and/or may include some or all of the components of the IHS 100. While illustrated and described as server devices, one of skill in the art in possession of the present disclosure will recognize that desktop computing devices, laptop/notebook computing devices, tablet computing devices, mobile phones, and/or other computing devices may be utilized in place of the server devices 204a-204c while remaining within the scope of the present disclosure.

In the illustrated embodiment, the networked system 200 also includes a plurality of client devices 204a, 204b, and up to 204c that are coupled to the workload/processor resource scheduling system 202 directly, via a network (e.g., a Local Area Network (LAN), the Internet, a management network, combinations thereof, and/or via any other networks known in the art), and/or in any other manner that would be apparent to one of skill in the art in possession of the present disclosure. Any or all of the client devices 206a-206c may be provided by the IHS 100 discussed above with reference to FIG. 1, and/or may include some or all of the components of the IHS 100. As will be appreciated by one of skill in the art in possession of the present disclosure, in the context of the VDI environments discussed in some of the examples provided herein, the client devices 206a-206c may be provided by virtual machines that run on server devices. While illustrated and described as virtual machines provided by server computing devices, one of skill in the art in possession of the present disclosure will recognize that other computing devices may be utilized as the client devices 206a-206c while remaining within the scope of the present disclosure. As discussed in further detail below, workloads may be performed by the server devices 204a-204c to provide the client devices 206a-206c based on workload/processor resource schedules managed by the workload/processor resource scheduling system 202. However, while a specific networked system 200 has been illustrated and described, one of skill in the art in possession of the present disclosure will recognize that the networked system 200 and workload/processor resource scheduling system 202 of the present disclosure may be utilized with a variety of components and component configurations while remaining within the scope of the present disclosure as well.

Figure 3:
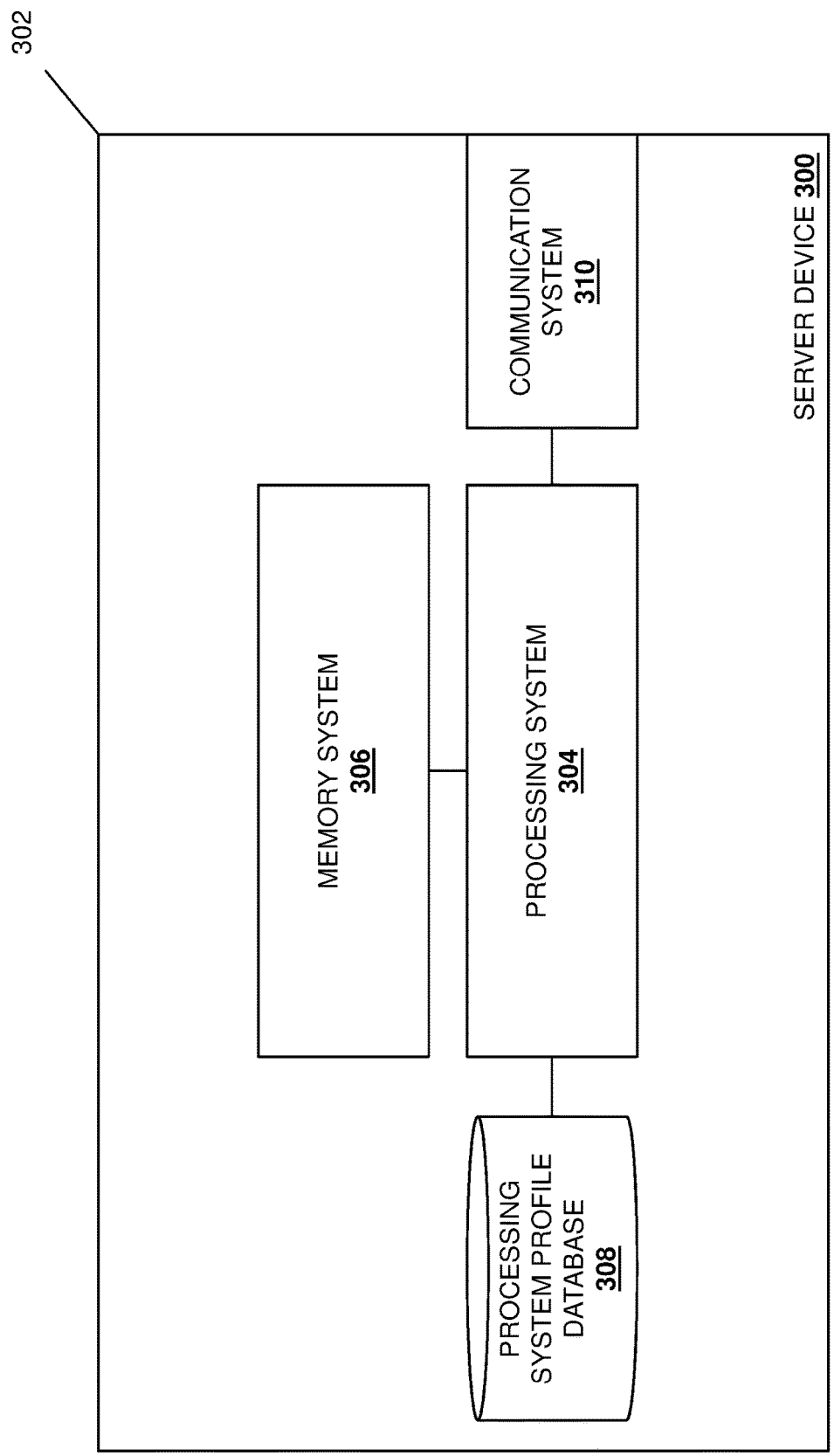
FIG. 3 is a schematic view illustrating an embodiment of a computing device that may be included in the networked system of FIG. 2.

Referring now to FIG. 3, an embodiment of a server device 300 is illustrated that may provide any or all of the server devices 204a-204c discussed above with reference to FIG. 2. As such, the server device 300 may be provided by the IHS 100 discussed above with reference to FIG. 1 and/or may include some or all of the components of the IHS 100, and while illustrated as provided by a server device, may be provided by desktop computing devices, laptop/notebook computing devices, tablet computing devices, mobile phones, and/or any other computing devices that would be apparent to one of skill in the art in possession of the present disclosure. As such, one of skill in the art in possession of the present disclosure will recognize that the functionality of the server device 300 discussed below may be provided by a variety of other devices that are configured to operate similarly as the server devices discussed below. In the illustrated embodiment, the server device 300 includes a chassis 302 that houses the components of the server device 300, only some of which are illustrated below.

In the illustrated embodiment, the chassis 302 houses a processing system 304 that, in some of the examples described below, is provided by a Graphics Processing Unit (GPU) processing system that includes a plurality of GPU processing subsystems provided by GPUs. However, while discussed as a GPU processing system including multiple GPUs, one of skill in the art in possession of the present disclosure will recognize that the processing system may utilize other processors (e.g., CPUs, etc.) while remaining within the scope of the present disclosure as well. In the illustrated embodiment, the chassis 302 also houses a memory system 306 that, in the examples below, is provided by a Graphics Processing Unit (GPU) memory system that is utilized by the GPU processing system and that includes a plurality of GPU memory subsystems provided by portions of the GPU memory system that are utilized by the respective GPUs in the GPU processing system. However, while discussed as a GPU memory system including multiple GPU memory subsystems, one of skill in the art in possession of the present disclosure will recognize that the memory system may be utilized by other processors (e.g., CPUs, etc.) while remaining within the scope of the present disclosure as well. As will be appreciated by one of skill in the art in possession of the present disclosure, the memory system 306 may be provided with instructions that, when executed by the processing system 304, cause the processing system 304 to perform operations such as the workload operations to provide the workloads discussed below, as well as any other operations described below and/or otherwise known in the art.

The chassis 302 may also house a storage system (not illustrated, but which may include the storage 108 discussed above with reference to FIG. 1) that is coupled to the processing system 304 and that includes a processing system profile database 308 that is configured to store the processing system profiles, scheduling information, and/or any of the other information utilized by the processing system 304 discussed below. The chassis 302 may also house a communication system 310 that is coupled to the processing system 304 and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
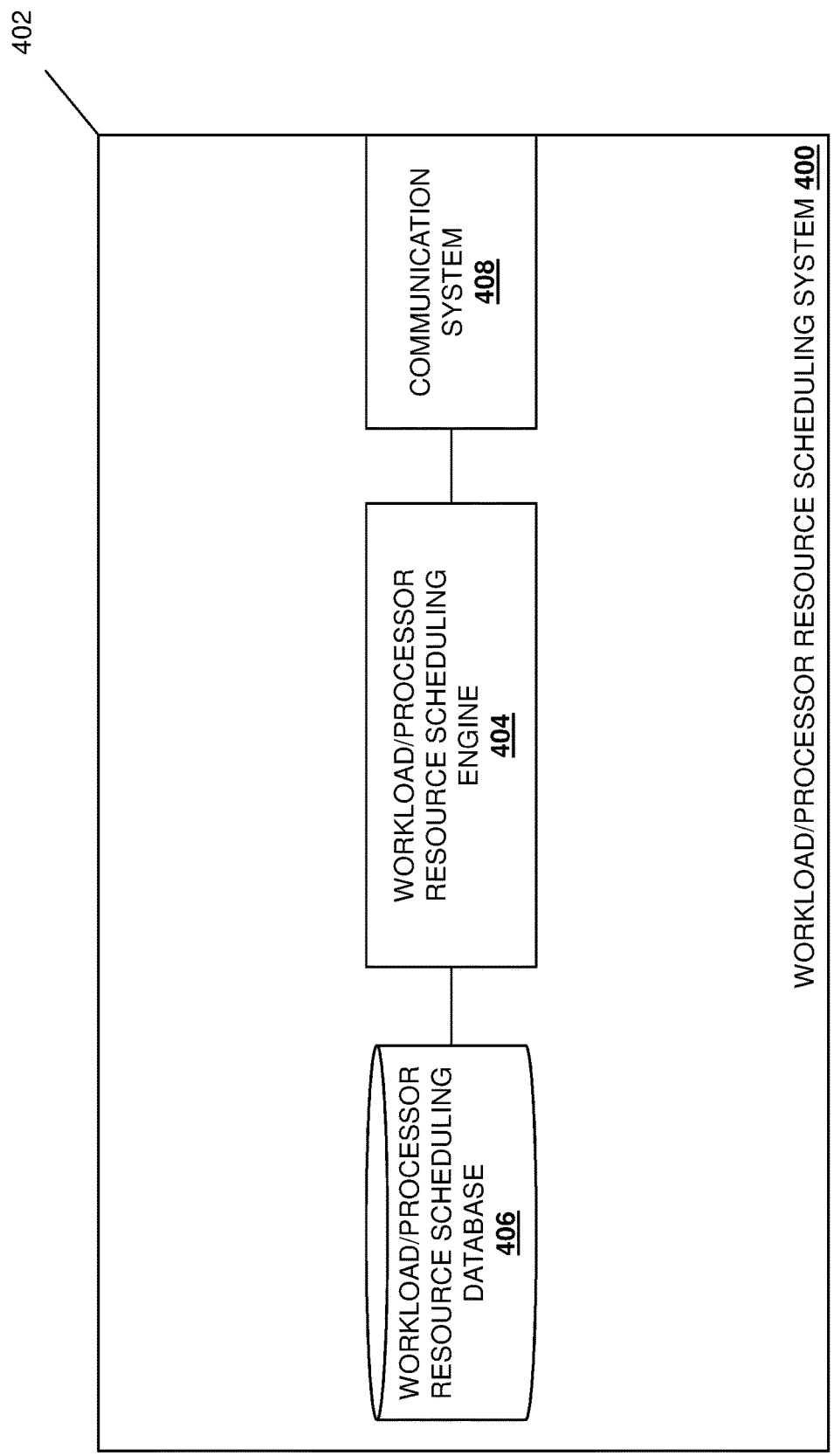
FIG. 4 is a schematic view illustrating an embodiment of a workload/processor resource scheduling system that may be included in the networked system of FIG. 2.

Referring now to FIG. 4, an embodiment of a workload/processor resource scheduling system 400 is illustrated that may provide the workload/processor resource scheduling system 202 discussed above with reference to FIG. 2. As such, the workload/processor resource scheduling system 400 may be provided by the IHS 100 discussed above with reference to FIG. 1 and/or may include some or all of the components of the IHS 100. Furthermore, while illustrated and discussed as provided by one or more server devices, one of skill in the art in possession of the present disclosure will recognize that the functionality of the workload/processor resource scheduling system 400 discussed below may be provided by other devices that are configured to operate similarly as the workload/processor resource scheduling system 400 discussed below. In the illustrated embodiment, the workload/processor resource scheduling system 400 includes a chassis 402 that houses the components of the workload/processor resource scheduling system 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a workload/processor resource scheduling engine 404 that is configured to perform the functionality of the workload/processor resource scheduling engines and/or workload/processor resource scheduling systems discussed below.

The chassis 402 may also house a storage system (not illustrated, but which may include the storage 108 discussed above with reference to FIG. 1) that is coupled to the workload/processor resource scheduling system 404 (e.g., via a coupling between the storage system and the processing system) and that includes a workload/processor resource scheduling database 406 that is configured to store any of the information utilized by the workload/processor resource scheduling engine 404 discussed below. The chassis 402 may also house a communication system 408 that is coupled to the workload/processor resource scheduling engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific workload/processor resource scheduling system 400 has been illustrated, one of skill in the art in possession of the present disclosure will recognize that workload/processor resource scheduling systems (or other devices operating according to the teachings of the present disclosure in a manner similar to that described below for the workload/processor resource scheduling system 400) may include a variety of components and/or component configurations for providing conventional resource scheduling and management functionality, as well as the functionality discussed below, while remaining within the scope of the present disclosure as well.

Figure 5A:
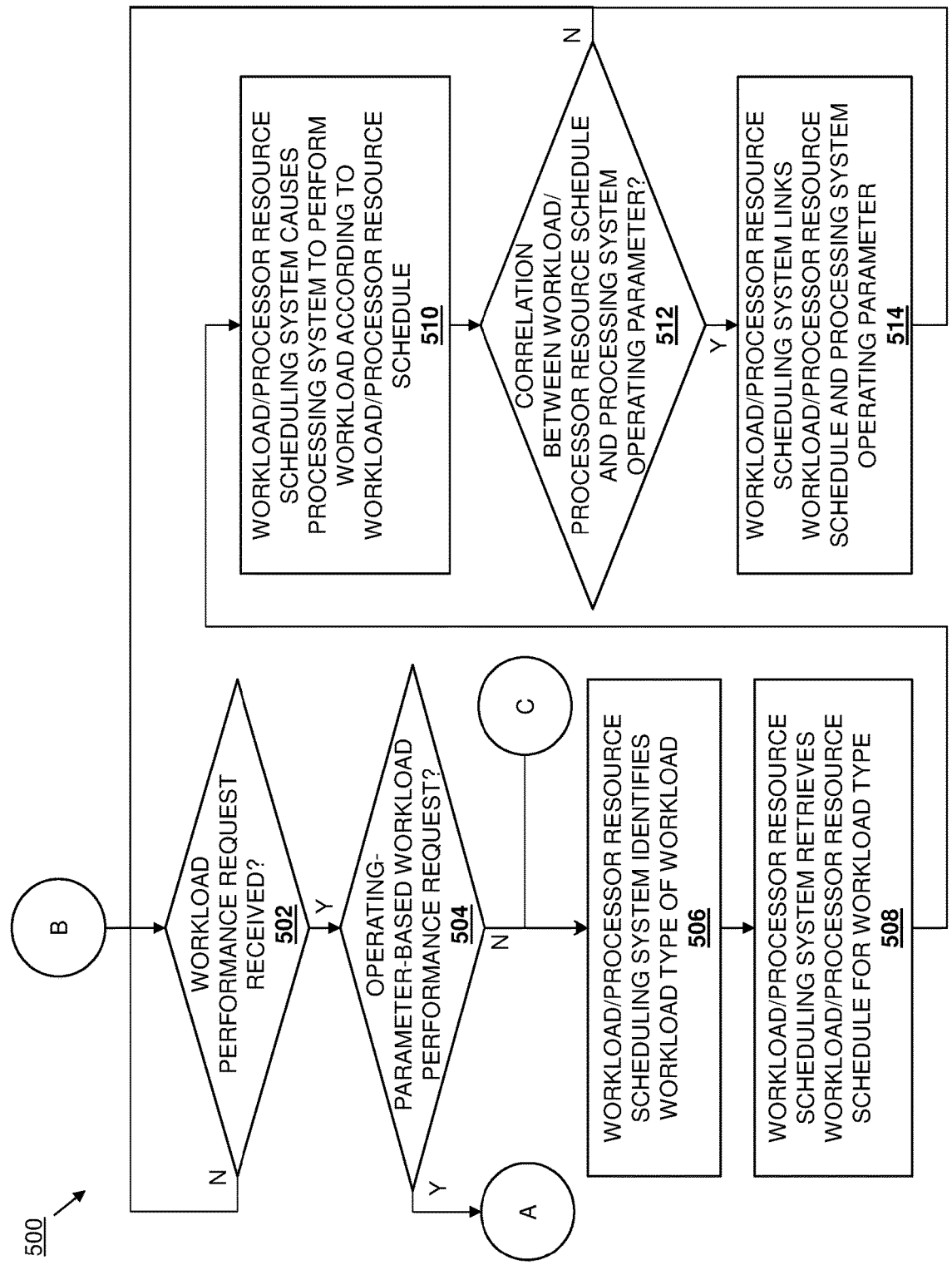
FIG. 5A is a flow chart illustrating an embodiment of a portion of a method for scheduling the use of processor resources for providing workloads.
Figure 5B:
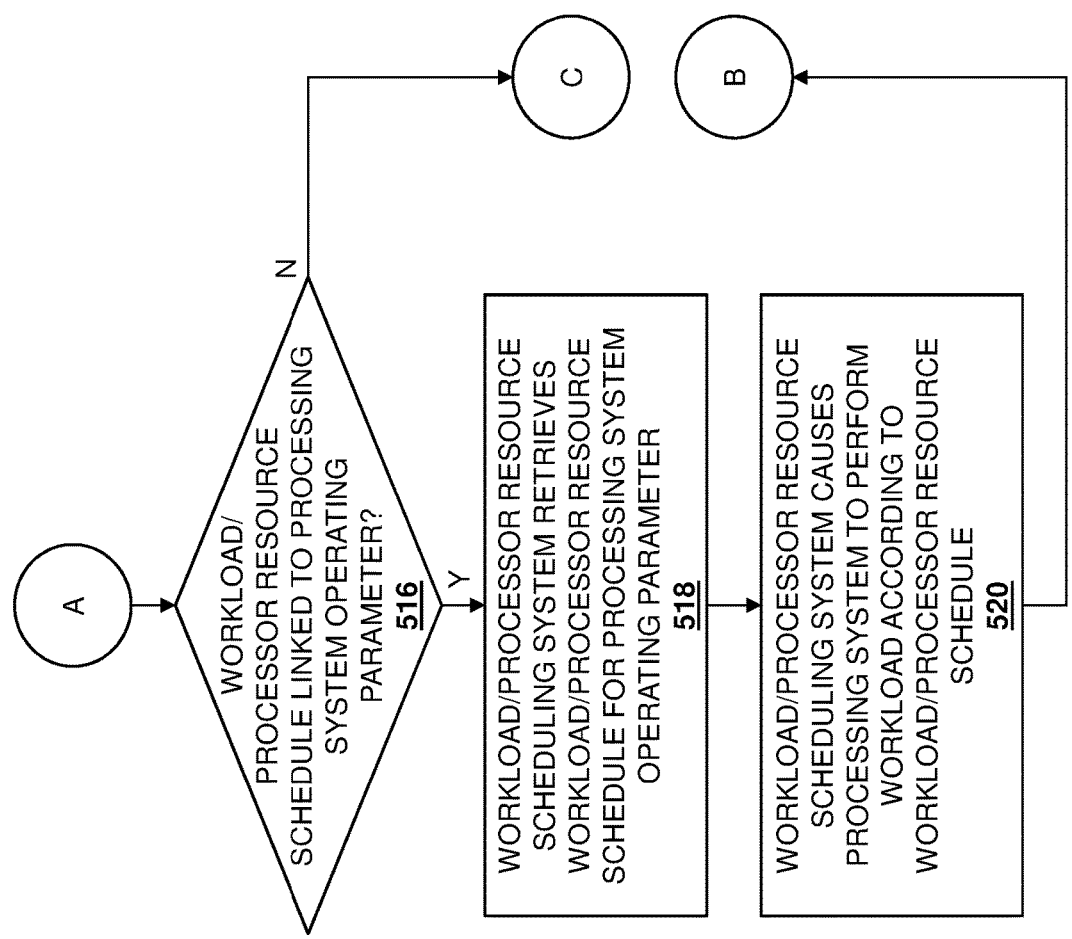
FIG. 5B is a flow chart illustrating an embodiment of a portion of the method for scheduling the use of processor resources for providing workloads of FIG. 5A.

Referring now to FIG. 5, an embodiment of a method 500 for scheduling the use of processor resources for providing workloads is illustrated. As discussed below, embodiments of the systems and methods of the present disclosure provide for the scheduling of workloads for performance by processing systems by first causing the performance of first workloads by processing systems according to workload/processor resource schedules that are based on the workload types of those first workloads. The performance of those first workloads according to those workload/processor resource schedules may then be monitored to determine if there is a correlation between their performance via the workload/processor resource schedule and an operating level of a processing system operating parameter of the processing system. In the event such a correlation exists, that workload/processor resource schedule may be linked with that processing system operating parameter, which allows users to subsequently request the performance of a second workload to produce a desired operating level of a processing system operating parameter, and if that processing system operating parameter has been linked to a workload/processor resource schedule, the second workload may be performed according to that workload/processor resource schedule. As such, workload/processor resource scheduling is enhanced by both optimizing the use of particular workload/processor resource schedules with particular workload types, as well as allowing for workload/processor resource scheduling that produces desired operating level(s) of processing system operating parameter(s) via the determination of correlations between those processing system operating parameter(s) and particular workload/processor resource schedules.

The method 500 begins at decision block 502 where it is determined whether a workload performance request has been received. In an embodiment, at decision block 502, the workload/processor resource scheduling engine 404 in the workload/processor resource scheduling system 202/400 may operate to monitor, via its communication system 408, for workload performance requests (e.g., from the client devices 206a-206c, from an administrator device (not illustrated), and/or from any other workload request sources that would be apparent to one of skill in the art in possession of the present disclosure.) For example, as discussed above, any of the client devices 206a-206c may generate and transmit a workload performance request to the workload/processor resource scheduling system 202 to request that a processing system 304 in a server device 202a-202c/300 (e.g., a Graphics Processing Unit (GPU) included on a GPU card) perform graphics acceleration utilized with a Virtual Desktop Infrastructure (VDI) environment that provides a virtual desktop on that client device. In another example, an administrator device may provide a workload performance request to the workload/processor resource scheduling system 202 to request that a processing system 304 in a server device 202a-202c/300 (e.g., a Graphics Processing Unit (GPU) included on a GPU card) perform non-graphics/general purpose workloads that may provide for Artificial Intelligence (AI) operations, Machine Learning (ML) operations, and/or Deep Learning (DL) operations. As such, at decision block 502, the workload/processor resource scheduling engine 404 may monitor for such workload performance requests to determine when such a workload performance request is received. However, while a few examples of workload performance requests have been described, one of skill in the art in possession of the present disclosure will recognize that a variety of different workload performance requests will fall within the scope of the present disclosure as well.

Figure 6A:
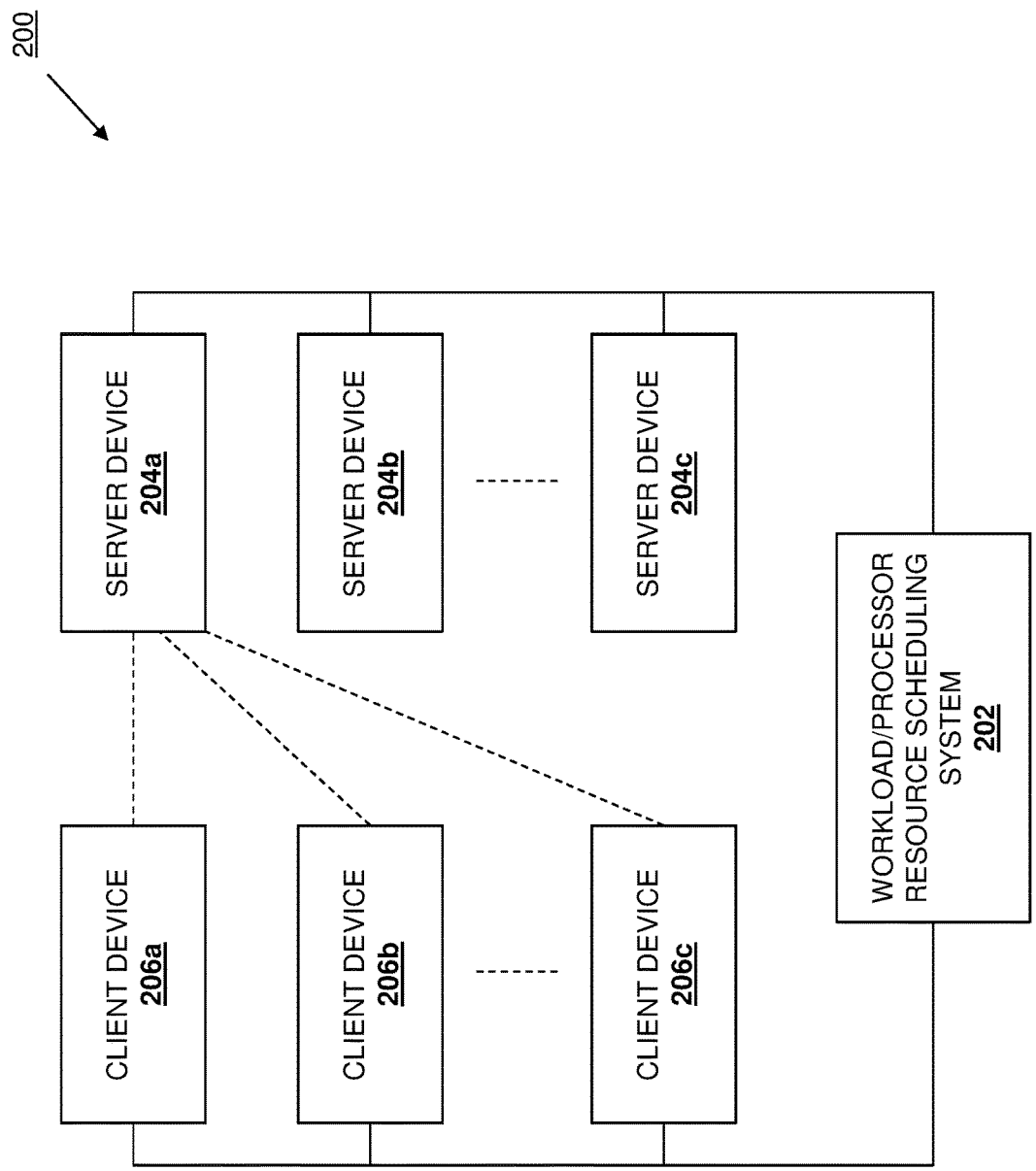
FIG. 6A is a schematic view illustrating an embodiment of the operation of the networked system of FIG. 2 during the method of FIG. 5.

If, at decision block 502, it is determined that no workload performance request has been received, the method 500 returns to decision block 502 such that the workload/processor resource scheduling engine 404 in the workload/processor resource scheduling system 202/400 loops through decision block 502 to continue to monitor whether a workload performance request is received. If at decision block 502, it is determined that a workload performance request has been received, the workload/processor resource scheduling engine 404 may identify a processing system 304 in one of the server devices 204a-204c/300 for performing the workload. One of skill in the art in possession of the present disclosure will recognize that the identification of a processing system for performing a workload may occur using a variety of techniques and at a variety of times during the method 500 that will fall within the scope of the present disclosure, and thus is not described herein in detail. In the examples below, and as illustrated in FIG. 6A, the processing system 304 in the server device 204a/300 may be identified (e.g., over multiple iterations of the method 500) to perform workloads for each of the computing devices 206a-206c (as illustrated by the respective dashed lines between the server device 202a and each of the computing devices 206a-206c), but one of skill in the art in possession of the present disclosure will recognize that the processing system 304 in any of the server devices 204a-204c may be identified for performing a workload while remaining within the scope of the present disclosure as well.

The method 500 then proceeds to decision block 504 where it is determined whether the workload performance request is an operating-parameter-based workload performance request. As discussed in further detail below, the workload/processor resource scheduling system 202 operates to detect correlations between the performance of workloads according to particular workload/processor resource schedules and operating levels of processing system operating parameters of the processing system that performs those workloads according to those workload/processor resource schedules. As such, workload performance requests received at decision block 502 may be operating-parameter-based workload performance requests that request the performance of a workload to produce a desired operating level in a processing system operating parameter, discussed in further detail below.

Thus, in an embodiment, at decision block 504 the workload/processor resource scheduling engine 404 in the workload/processor resource scheduling system 202/400 may determine whether the workload performance request received at decision block 502 identifies a processing system operating parameter, requests the performance of a workload to produce a desired operating level in a processing system operating parameter, include an indicator (e.g., a flag) that the workload performance request is an operating-parameter-based workload performance request, and/or includes any other information that one of skill in the art in possession of the present disclosure would recognize as indicative of the operating-parameter-based workload performance requests discussed below. However, while a few examples have been described, one of skill in the art in possession of the present disclosure will recognize that decision block 504 may be performed in a variety of manners, including determining whether the workload performance request is a conventional workload performance request rather than an operating-parameter-based workload performance request, while remaining within the scope of the present disclosure as well.

If at decision block 504 it is determined that the workload performance request is not an operating-parameter-based workload performance request, the method 500 proceeds to block 506 where the workload/processor resource scheduling system identifies a workload type of the workload. At block 506, the workload/processor resource scheduling engine 404 in the workload/processor resource scheduling system 202/400 may operate to identify a workload type of the workload associated with the workload request received at block 502. In some embodiments, the workload type of a workload may be identified by monitoring communications between the client devices 206a-206c and the server devices 204a-204c (e.g., communications by virtual machines that provide the client devices 204a-204c and that are provided by the server devices 204a-204c in the VDI environments described in some of the examples provided herein.) As will be appreciated by one of skill in the art in possession of the present disclosure, the assignment of the processing system for use by a workload provided for a client device may be followed by the client device communicating with that processing system, and those communications may be monitored to identify the workload type. For example, the workload/processor resource scheduling engine 404 may monitor GPU system calls using GPU system tools such as, for example, the NVIDIA® System Management Interface (often referred to as "nvidia-smi") available from NVIDIA® Corporation of Santa Clara, Calif., United States, which one of skill in the art in possession of the present disclosure will recognize is a command line utility that is based on top of the NVIDIA® Management Library (MVML), and that is intended to aid in the management and monitoring of NVIDIA GPU devices. However, one of skill in the art in possession of the present disclosure will recognize that other techniques for monitoring client device/server device communications and/or GPU system calls will fall within the scope of the present disclosure as well.

In a specific example, at block 506 the workload/processor resource scheduling engine 404 may identify a GPU system call from a client device to a server device that is directed to a graphics Application Programming Interface (API) such as DIRECTX® (available from MICROSOFT® Corporation of Redmond Wash., United States) and/or OPENGL® (open source software managed by the KHRONOS® Group consortium of Beaverton, Oreg., United States). In response to identifying the GPU system call to the graphics API, the workload/processor resource scheduling engine 404 may determine that the workload associated with the workload request is a graphics workload type such as the VDI workloads discussed above. In another specific example, at block 506 the workload/processor resource scheduling engine 404 may identify a GPU system call from a client device to a server device that is directed to a library such as KERAS® (an open source neural-network library written in Python). In response to identifying the GPU system call to the library, the workload/processor resource scheduling engine 404 may determine that the workload associated with the workload request is a non-graphics workload type such as the AI, ML, and/or DL workloads discussed above. While a few specific examples of identifying a workload type of a workload have been described, one of skill in the art in possession of the present disclosure will recognize that a workload type of a workload may be identified in a variety of manners that will fall within the scope of the present disclosure as well.

The method 500 then proceeds to block 508 where the workload/processor resource scheduling system retrieves a workload/processor resource schedule for the workload type. In an embodiment, at block 508, the workload/processor resource scheduling engine 404 in the workload/processor resource scheduling system 202/400 may operate to use the workload type determined at block 506 to retrieve a workload/processor resource schedule that is associated with the workload type in the workload/processor resource scheduling database 406. As such, prior to the method 500, workload/processor resource schedules may be associated with different workload types in the workload/processor resource scheduling database 406. In some embodiments, workload/processor resource schedules may be provided by "round robin" GPU resource scheduling schemes such as, for example, best effort processor resource schedules that allocate GPU resources (e.g., GPU processing cycles) in a "pure" round robin manner to workloads as those workload require them, thus addressing each request from a workload by to completion before addressing a request from another workload.

In another example, the round robin GPU resource scheduling schemes utilized in the workload/processor resource schedules may include equal share processor resource schedules that allocate GPU resources (e.g., GPU processing cycles) equally to each workload utilizing a GPU (e.g., 32 workloads currently utilizing a GPU via an equal share processing resource schedule will each be allocated $\frac{1}{32}$ of the resources of that GPU, 16 workloads later utilizing that GPU via the equal share processing resource schedule will each be allocated $\frac{1}{16}$ of the resources of that GPU, and so on.) In yet another example, the round robin GPU resource scheduling schemes utilized in the workload/processor resource schedules may include fixed share processor resource schedules that allocate GPU resources (e.g., GPU processing cycles) to each workload based on a fixed configuration/profile for those workloads (e.g., a first workload may require a particular amount of GPU resources, a second workload may require a particular amount of GPU resources, as so on), which can result in workloads provided by a GPU being allocated GPU resources even though those workloads are not currently being performed. However, while specific workload/processor resource schedules/GPU resource scheduling schemes have been described, one of skill in the art in possession of the present disclosure will recognize that a variety of schedules/scheduling schemes will fall within the scope of the present disclosure as well.

Furthermore, workload/processor resource schedules and workload types may be associated in a variety of different manners depending on the workload functionality. In an embodiment, continuing with the specific example provided above of graphics workloads provided by VDI workloads, the workload/processor resource scheduling database 406 may associate the graphics workloads/VDI workloads with the equal share processor resource schedules discussed above, which one of skill in the art in possession of the present disclosure will recognize may provide each user the best experience with their respective VDI desktop, as each VDI desktop will be provided by an equal share of the resources of the GPU performing those VDI/graphics workloads. In another embodiment, continuing with the specific example provided above of non-graphics workloads provided by AI/ML/DL workloads, the workload/processor resource scheduling database 406 may associate the non-graphics workloads/AI workloads/ML workloads/DL workloads with the best effort processor resource schedules discussed above, which one of skill in the art in possession of the present disclosure will recognize may provide maximum resources to any particular non-graphics workload/AI workload/ML workload/DL workload so that it can complete its process as quickly as possible. As such, at block 508, the workload/processor resource scheduling engine 404 may retrieve the workload/processor resource schedule for the workload type identified at block 506.

In yet another embodiment, the workload/processor resource scheduling engine 404 may be configured to retrieve workload/processor resource schedules for workloads based on factors other than the workload type of the workload. For example, the workload/processor resource scheduling engine 404 may be configured to determine an amount of resources of a processing system that are is being utilized to perform workloads, and may retrieve a workload/processor resource schedule based on that current utilization. In a specific example, a GPU may be performing workloads according to a fixed share processor resource schedule (i.e., where each workload is allocated a fixed percentage of the total resources of the GPU whether or not that workload is utilizing its allocated resources, as discussed above), and the workload/processor resource scheduling engine 404 may determine the current utilization of those total resources in order to determine whether to change the workload/processor resource schedule.

For example, in the event that the workload/processor resource scheduling engine 404 determines that not all of the resources of the GPU are being utilized, the workload/processor resource scheduling engine 404 may be configured to retrieve the equal share processor resource schedule for use in changing the workload/processor resource schedule for that GPU from the fixed share processor resource schedule to the equal share processor resource schedule (i.e., to allocate each of the workloads currently using that GPU a greater share of the currently unused resources of that GPU.) However, in the event that the workload/processor resource scheduling engine 404 determines that all of the resources of the GPU are being utilized, the workload/processor resource scheduling engine 404 may not retrieve a workload/processor resource schedule so that the workload/processor resource schedule for that GPU may remain the fixed share processor resource schedule.

The method 500 then proceeds to block 510 where the workload/processor resource scheduling system causes a processing system to perform the workload according to the workload/processor resource schedule. In an embodiment, at block 510, the workload/processor resource scheduling engine 404 in the workload/processor resource scheduling system 202/400 may operate to cause the processing system 304 identified at decision block 502 to perform the workload according to the workload/processor resource schedule retrieved at block 508. As such, at block 510 the workload/processor resource scheduling engine 404 may cause the processing system 304 to perform a graphics workload/VDI workload according to an equal share processor resource schedule, which as discussed above may provide each user the best experience with their respective VDI desktop, as each VDI desktop will be provided by an equal share of the resources of the GPU performing those VDI/graphics workloads.

In another embodiment, at block 510, the workload/processor resource scheduling engine 404 may cause the processing system 304 to perform a non-graphics workload/AI workload/ML workload/DL workload according to a best effort processor resource schedule, which as discussed above may provide maximum resources to any particular non-graphics workload/AI workload/ML workload/DL workload so that it can complete its process as quickly as possible. In yet another embodiment, the workload/processor resource scheduling engine 404 may cause a processing system 304 to perform a workload, and in response to determining that that processing system 304 is operating according to a fixed share processor resource schedule and does not currently have all of its resources utilized, may change a workload/processor resource schedule for that processing system 304 from the fixed share processor resource schedule to an equal share processor resource schedule (i.e., to allocate each of the workloads currently using that processing system a greater share of its currently unused resources.)

The method 500 then proceeds to decision block 512 where it is determined whether there is a correlation between the workload/processor resource schedule and a processing system operating parameter. In an embodiment, at decision block 512, the workload/processor resource scheduling engine 404 in the workload/processor resource scheduling system 202/400 may operate to monitor the performance of workloads by processing systems according to workload/processor resource schedules in order to identify correlations between the workload/processor resource schedules and any processing system operating parameters. For example, the workload/processor resource scheduling engine 404 may be configured to perform Pearson product-moment-based correlation techniques in order to identify correlations between the workload/processor resource schedules and any processing system operating parameters, although other correlation techniques will fall within the scope of the present disclosure as well.

For example, in some embodiments, processing system operating parameters of interest may be identified (e.g., by an administrator) in the workload/processor resource scheduling database 406. As such, at decision block 512, the workload/processor resource scheduling engine 404 may operate to monitor the performance of workloads by processing systems according to workload/processor resource schedules in order to identify correlations between the workload/processor resource schedules and any processing system operating parameters identified in the workload/processor resource scheduling database 406. In a specific example, the workload/processor resource scheduling engine 404 may use the Pearson product-moment-based correlation techniques discussed above to calculate Pearson correlation coefficients for any particular workload/processor resource schedule and any processing system operating parameters identified in the workload/processor resource scheduling database 406, and then stack rank the workload/processor resource schedules based on their Pearson correlation coefficient associated with any processing system operating parameter to prioritize workload/processor resource schedules that are most highly correlated with processing system operating parameters. In some embodiments, workload/processor resource schedules may be considered sufficiently correlated with processing system operating parameters when an associated Pearson correlation coefficient passes some correlation coefficient threshold, although other correlation qualifiers will fall within the scope of the present disclosure as well.

As such, continuing with the specific examples provided above, the workload/processor resource scheduling engine 404 may attempt to identify correlations between any of the best effort processor resource schedules, the equal share processor resource schedules, and the fixed share processor resource schedules utilized by processing systems to perform graphics workloads and non-graphics workloads, and processing system operating parameters for those processing systems such as processing consumption (e.g., GPU processing cycle consumption), processing system temperature (e.g., GPU temperature), processing system power consumption (e.g., GPU power consumption), and/or any other processing system operating parameters that would be apparent to one of skill in the art in possession of the present disclosure.

If, at decision block 512, it is determined that there is no correlation between the workload/processor resource schedule and a processing system operating parameter, the method 500 returns to decision block 502 to continue to monitor whether a workload performance request is received. However, if at decision block 512 it is determined that there is a correlation between the workload/processor resource schedule and a processing system operating parameter, the method 500 proceeds to block 514 where the workload/processor resource scheduling system links the workload/processor resource schedule and the processing system operating parameter. In an embodiment, at block 514, the workload/processor resource scheduling engine 404 in the workload/processor resource scheduling system 202/400 may determine at decision block 512 that there is a correlation between a workload/processor resource schedule used to perform workloads by the processing system 304 and one or more processing system operating parameters of that processing system 304 (e.g., based on a correlation coefficient for the two exceeding a correlation coefficient threshold) and, in response, may link that workload/processor resource schedule and those processing system operating parameter(s) in the workload/processor resource scheduling database 406.

For example, at decision block 512 the workload/processor resource scheduling engine 404 may identify a correlation between the performance of workloads using a best effort processor resource schedule by the processing system 304, and a processing consumption (e.g., GPU processing cycle consumption) of that processing system 304 and, in response, may link the best effort processor resource schedule and the processing consumption operating parameter at block 514. Similarly, at decision block 512 the workload/processor resource scheduling engine 404 may identify a correlation between the performance of workloads using an equal share processor resource schedule by the processing system 304, and a processing system temperature (e.g., GPU temperature) of that processing system 304 and, in response, may link the equal share processor resource schedule and the processing system temperature operating parameter at block 514. Similarly, at decision block 512 the workload/processor resource scheduling engine 404 may identify a correlation between the performance of workloads using a fixed share processor resource schedule by the processing system 304, and a processing system power consumption (e.g., GPU power consumption) of that processing system 304 and, in response, may link the fixed share processor resource schedule and the processing system power consumption operating parameter at block 514. However, while a few specific examples have been provided, one of skill in the art in possession of the present disclosure will recognize that any workload/processor resource schedules may be linked to any processing system operating parameters in the event a correlation is identified between the two.

The method 500 then returns to decision block 502 to continue to monitor whether a workload performance request is received. As such, as long as an operating-parameter-based workload performance request is not received (as determined at decision block 504), the method 500 may loop through blocks 502, 504, 506, 508, 510, 512, and 514 to receive workload performance requests, identify workload types of the workloads associated with those workload performance requests, retrieve workload/processor resource schedules for those workloads based on their workload types, identify when correlations exists between the performance of any workload according to a workload/processor resource schedule and a processing system operating parameter of the processing system performing that workload according to that workload/processor resource schedule, and link the workload/processor resource schedule and a processing system operating parameter when such a correlation is identified. In some embodiments, blocks 502, 504, 506, 508, 510, 512, and 514 of the method 500 may be performed on a control group of workloads and/or users in order to provide a "learning/correlating phase" of the method 500 that allows the workload/processor resource schedule/processing system operating parameter correlations to be identified and linked as described herein.

However, in the event it is determined that the workload performance request is an operating-parameter-based workload performance request at decision block 504, the method 500 proceeds to decision block 516 where it is determined whether there is a workload/processor resource schedule linked to the processing system operating parameter. As discussed above, blocks 510, 512 and 514 of the method 500 operate to cause the performance of workloads by processing systems according to workload/processor resource schedules, identify if correlations exist between the use of any workload/processor resource schedules and any processing system operating parameters of the processing system performing workloads according to those workload/processor resource schedules and, if so, link those workload/processor resource schedules and processing system operating parameters in the workload/processor resource scheduling database 406. As such, in an embodiment of decision block 516, the workload/processor resource scheduling engine 404 in the workload/processor resource scheduling system 202/400 may identify the processing system operating parameter(s) included in the operating-parameter-based workload performance request (i.e., the processing system operating parameter(s) for which a desired operating level is requested during the performance of a workload), and determine whether those processing system operating parameter(s) have been linked to any workload/processor resource schedules in the workload/processor resource scheduling database 406. However, while a specific correlation linking determination technique has been described, one of skill in the art in possession of the present disclosure will recognize that workload/processor resource schedules correlated with processing system operating parameters may be identified in any of a variety of manners that will fall within the scope of the present disclosure as well.

If, at decision block 516, it is determined that there is not a workload/processor resource schedule linked to the processing system operating parameter, the method 500 proceeds to block 506 to identify a workload type of the workload in substantially the same manner as described above. As such, in the event an operating-parameter-based workload performance request is received but no correlation has been identified between the processing system operating parameter(s) identified in that operating-parameter-based workload performance request and any of the workload/processor resource schedules, the method 500 returns to blocks 506, 508, 510, 512, and 514 to identify a workload type of the workload associated with that operating-parameter-based workload performance request, retrieve a workload/processor resource schedule for that workload based on its workload type, identify whether correlations exists between the performance of that workload according to the workload/processor resource schedule and a processing system operating parameter of the processing system performing that workload according to that workload/processor resource schedule, and link the workload/processor resource schedule and a processing system operating parameter when such a correlation is identified.

If at decision block 516, it is determined that there is a workload/processor resource schedule linked to the processing system operating parameter, the method 500 proceeds to block 518 where the workload/processor resource scheduling system retrieves a workload/processor resource schedule for the processing system operating parameter. In an embodiment of block 518, the workload/processor resource scheduling engine 404 in the workload/processor resource scheduling system 202/400 may operate to retrieve the workload/processor resource schedule that is linked with the processing system operating parameter(s) in the workload/processor resource scheduling database 406. As such, continuing with the specific examples provided above, at block 518 the workload/processor resource scheduling engine 404 may retrieve a best effort processor resource schedule linked with a processing consumption operating parameter, an equal share processor resource schedule linked with a processing system temperature operating parameter, or a fixed share processor resource schedule linked with a processing system power consumption operating parameter. However, while a few specific examples have been provided, one of skill in the art in possession of the present disclosure will recognize that any workload/processor resource schedules may be retrieved at block 518 if it has been linked to any processing system operating parameters based on a correlation that is identified between the two.

Figure 6B:
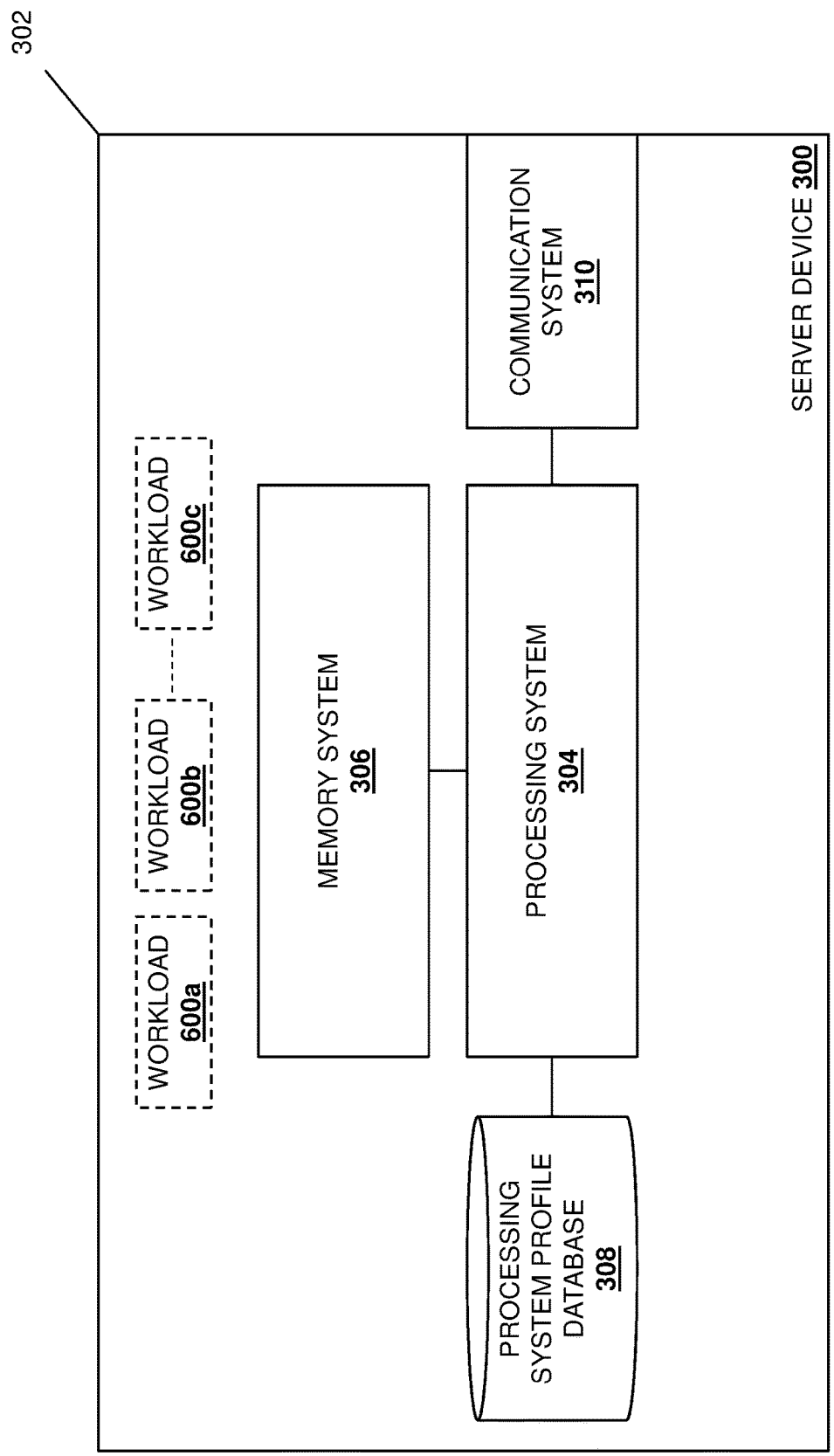
FIG. 6B is a schematic view illustrating an embodiment of the operation of the computing device of FIG. 3 during the method of FIG. 5.

The method 500 then proceeds to block 520 where the workload/processor resource scheduling system causes a processing system to perform the workload according to the workload/processor resource schedule. In an embodiment, at block 520, the workload/processor resource scheduling engine 404 in the workload/processor resource scheduling system 202/400 may operate to cause the processing system 304 identified at decision block 502 to perform the workload according to the workload/processor resource schedule retrieved at block 518. As such, at block 510 the workload/processor resource scheduling engine 404 may cause the processing system 304 to perform a workload according to a workload/processor resource schedule that has been determined to be correlated with desired processing system operating parameter(s) that were identified in the operating-parameter-based workload performance request. FIG. 6B illustrates the processing system 304 in the server device 202a/300 utilizing instructions on the memory system 306 to perform a plurality of workloads 600a, 600b, and up to 600c, the performance of each of which by the processing system 304 may be caused during different iterations of the method 500.

Continuing with the specific examples provided above, at block 520 the processing system 304 may operate according to a best effort processor resource schedule to perform a workload while producing a desired operating level of a processing consumption operating parameter (e.g., utilizing 50% of a GPU processing cycle capability as identified in the operating-parameter-based workload performance request), or may operate according to an equal share processor resource to perform a workload while producing a desired operating level of a processing system temperature operating parameter (e.g., producing no more than a maximum GPU temperature identified in the operating-parameter-based workload performance request), or may operate according to a fixed share processor resource schedule to perform a workload while producing a desired operating level of a processing system power consumption operating parameter (e.g., consuming no more than a maximum power amount identified in the operating-parameter-based workload performance request). However, while a few specific examples have been provided, one of skill in the art in possession of the present disclosure will recognize that any workload/processor resource schedules may be performed by a processing system to produce any desired operating level of any processing system operating parameters when a correlation has been identified between the two. The method 500 may then return to decision block 502 to continue to monitor whether a workload performance request is received.

Thus, systems and methods have been described that provide for the scheduling of workloads for performance by GPUs by first causing the performance of first workloads by GPUs according to workload/GPU resource schedules that are based on the workload types of those first workloads. The performance of those first workloads according to those workload/GPU resource schedules may then be monitored to determine if there is a correlation between their performance via the workload/GPU resource schedule and an operating level of a GPU operating parameter of the GPU. In the event such a correlation exists, that workload/GPU resource schedule may be linked with that GPU operating parameter, which allows users to subsequently request the performance of a second workload to produce a desired operating level of a GPU operating parameter, and if that GPU operating parameter has been linked to a workload/GPU resource schedule, the second workload may be performed according to that workload/GPU resource schedule. As such, workload/GPU resource scheduling is enhanced by both optimizing the use of particular workload/GPU resource schedules with particular workload types, as well as allowing for workload/GPU resource scheduling that produces desired operating level(s) of GPU operating parameter(s) via the determination of correlations between those GPU operating parameter(s) and particular workload/GPU resource schedules.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A networked system, comprising:
    a first server device including a first processing system; and
    a workload/processor resource scheduling system that is coupled to the server device and that is configured to:
        monitor a performance of at least one first workload by the first processing system according to a first workload/processor resource schedule that is one of a plurality of different predefined workload/processor resource schedules and that defines how first processing system resources of the first processing system and second processing system resources of at least one second processing system included in at least one second server device are allocated to a plurality of workloads performed by the first processing system and the at least one second processing system;
identify a correlation between:
the performance of the at least one first workload according to the first workload/processor resource schedule; and
an operating level of a first processing system operating parameter produced by the first processing system in response to performing the at least one first workload according to the first workload/processor resource schedule, wherein the first processing system operating parameter includes one of a processing cycle consumption of the first processing system, a temperature of the first processing system, and a power consumption of the first processing system;
link, based on the correlation, the first workload/processor resource schedule and the first processing system operating parameter;
receive, subsequent to linking the first workload/processor resource schedule and the first processing system operating parameter, an operating-parameter-based request to produce the operating level of the first processing system operating parameter for the first processing system, which was produced by the first processing system when performing the at least one first workload, when performing a second workload that is different than the first workload; and
cause, based on the operating-parameter-based request and the linking of the first workload/processor resource schedule and the first processing system operating parameter, the performance of the second workload by the first processing system based on the first workload processor resource schedule in order to produce the operating level of the first processing system operating parameter for the first processing system that was produced by the first processing system when performing the at least one first workload.

2. The system of claim 1, wherein the workload/processor resource scheduling system is configured, for each at least one first workload, to:
identify a workload type of that first workload;
retrieve, based on the workload type, the first workload/processor resource schedule; and
cause the first processing system to perform that first workload according to the first workload/processor resource schedule.

3. The system of claim 2, wherein the workload type is a graphics workload type and the workload/processor resource schedule is an equal share processor resource schedule.

4. The system of claim 2, wherein the workload type is a non-graphics workload and the workload/processor resource schedule is a best effort processor resource schedule.

5. The system of claim 2, wherein the workload/processor resource scheduling system is configured, for each at least one first workload, to:
determine whether the first processing system is performing a maximum number of workloads;
cause, in response to determining that the first processing system is performing the maximum number of workloads, the first processing system to perform that first workload according to a fixed share processor resource schedule; and
cause, in response to determining that the first processing system is not performing the maximum number of workloads, the first processing system to perform that first workload according to an equal share processor resource schedule.

6. The system of claim 1, wherein first processing system is a graphics processing system.

7. An Information Handling System (IHS), comprising:
a workload/processor resource scheduling processing system; and
a workload/processor resource scheduling memory system that is coupled to the workload/processor resource scheduling processing system and that includes instructions that, when executed by the workload/processor resource scheduling processing system, cause the workload/processor resource scheduling processing system to provide a workload/processor resource scheduling engine that is configured to:
monitor a performance of at least one first workload by a first workload performing processing system according to a first workload/processor resource schedule that is one of a plurality of different predefined workload/processor resource schedules and that defines how first workload performing processing system resources of the first workload performing processing system and second workload performing processing system resources of at least one second workload performing processing system are allocated to a plurality of workloads performed by the first workload performing processing system and the at least one second workload performing processing system;
identify a correlation between:
the performance of the at least one first workload according to the first workload/processor resource schedule; and
an operating level of a first workload performing processing system operating parameter produced by the first workload performing processing system in response to performing the at least one first workload according to the first workload/processor resource schedule, wherein the first processing system operating parameter includes one of a processing cycle consumption of the first workload performing processing system, a temperature of the first workload performing processing system, and a power consumption of the first workload performing processing system;
link, based on the correlation, the first workload/processor resource schedule and the first workload performing processing system operating parameter;
receive, subsequent to linking the first workload/processor resource schedule and the first workload performing processing system operating parameter, an operating-parameter-based request to produce the operating level of the first workload performing processing system operating parameter for the first workload performing processing system, which was produced by the first workload performing processing system when performing the at least one first workload, when performing a second workload that is different than the first workload; and
cause, based on the operating-parameter-based request and the linking of the first workload/processor resource schedule and the first workload performing processing system operating parameter, the performance of the second workload by the first workload performing processing system based on the first workload processor resource schedule in order to produce the operating level of the first workload performing processing system operating parameter for the first workload performing processing system that was produced by the first workload performing processing system when performing the at least one first workload.

8. The IHS of claim 7, wherein the workload/processor resource scheduling engine is configured, for each at least one first workload, to:
identify a workload type of that first workload;
retrieve, based on the workload type, the first workload/processor resource schedule; and
cause the first workload performing processing system to perform that first workload according to the first workload/processor resource schedule.

9. The IHS of claim 8, wherein the workload type is a graphics workload type and the workload/processor resource schedule is an equal share processor resource schedule.

10. The IHS of claim 8, wherein the workload type is a non-graphics workload and the workload/processor resource schedule is a best effort processor resource schedule.

11. The IHS of claim 8, wherein the workload/processor resource scheduling system is configured, for each at least one first workload, to:
determine whether the first workload performing processing system is performing a maximum number of workload;
cause, in response to determining that the first workload performing processing system is performing the maximum number of workloads, the first workload performing processing system to perform that first workload according to a fixed share processor resource schedule; and
cause, in response to determining that the first workload performing processing system is not performing the maximum number of workloads, the first workload performing processing system to perform that first workload according to an equal share processor resource schedule.

12. The IHS of claim 7, wherein the identifying workload type includes:
monitoring communications between the first workload performing processing system and a client;
detecting one of a graphics workload communication and a non-graphics workload communication;
identifying, in response to detecting the graphics workload communication, a graphics workload; and
identifying, in response to detecting the non-graphics workload communication, a non-graphics workload.

13. The IHS of claim 7, wherein first workload performing processing system a graphics processing system.

14. A method for scheduling the use of processor resources for providing workloads, comprising:
monitoring, by a workload/processor resource scheduling system, a performance of at least one first workload by a first processing system according to a first workload/processor resource schedule that is one of a plurality of different predefined workload/processor resource schedules and that defines how first processing system resources of the first processing system and second processing system resources of at least one second processing system are allocated to a plurality of workloads performed by the first processing system and the at least one second processing system;
identifying, by the workload/processor resource scheduling system, a correlation between:
the performance of the at least one first workload according to the first workload/processor resource schedule; and
an operating level of a first processing system operating parameter produced by the first processing system in response to performing the at least one first workload according to the first workload/processor resource schedule, wherein the first processing system operating parameter includes one of a processing cycle consumption of the first processing system, a temperature of the first processing system, and a power consumption of the first processing system;
linking, by the workload/processor resource scheduling system based on the correlation, the first workload/processor resource schedule and the first processing system operating parameter;
receiving, by the workload/processor resource scheduling system subsequent to linking the first workload/processor resource schedule and the first processing system operating parameter, an operating-parameter-based request to produce the operating level of the first processing system operating parameter for the first processing system, which was produced by the first processing system when performing the at least one first workload, when performing a second workload; and
causing, by the workload/processor resource scheduling system based on the operating-parameter-based request and the linking of the first workload/processor resource schedule and the first processing system operating parameter, the performance of the second workload by the first processing system based on the first workload processor resource schedule in order to produce the operating level of the first processing system operating parameter for the first processing system that was produced by the first processing system when performing the at least one first workload.

15. The method of claim 14, further comprising:
identifying, by the workload/processor resource scheduling system for each at least one first workload, a workload type of that first workload;
retrieving, by the workload/processor resource scheduling system for each at least one first workload based on the workload type, the first workload/processor resource schedule; and
causing, by the workload/processor resource scheduling system for each at least one first workload, the first processing system to perform that first workload according to the workload/processor resource schedule.

16. The method of claim 15, wherein the workload type is a graphics workload type and the workload/processor resource schedule is an equal share processor resource schedule.

17. The method of claim 15, wherein the workload type is a non-graphics workload and the workload/processor resource schedule is a best effort processor resource schedule.

18. The method of claim 15, further comprising:
determining, by the workload/processor resource scheduling system for each at least one first workload, whether the first processing system is performing a maximum number of workload;
causing, by the workload/processor resource scheduling system for each at least one first workload and in response to determining that the first processing system is performing the maximum number of workloads, the first processing system to perform that first workload according to a fixed share processor resource schedule; and causing, by the workload/processor resource scheduling system for each at least one first workload and in response to determining that the first processing system is not performing the maximum number of workloads, the first processing system to perform that first workload according to an equal share processor resource schedule.

19. The method of claim 15, wherein the identifying workload type includes:
monitoring communications between the first processing system and a client;
detecting one of a graphics workload communication and a non-graphics workload communication;
identifying, in response to detecting the graphics workload communication, a graphics workload; and
identifying, in response to detecting the non-graphics workload communication, a non-graphics workload.

20. The method of claim 14, wherein first processing system is a graphics processing system.

\* \* \* \* \*

UNITED STATES PATENT AND TRADEMARK OFFICE
CERTIFICATE OF CORRECTION

PATENT NO. : 11,422,858 B2
APPLICATION NO. : 16/508078
DATED : August 23, 2022
INVENTOR(S) : John Kelly Page 1 of 1

It is certified that error appears in the above-identified patent and that said Letters Patent is hereby corrected as shown below:

In the Claims

Claim 13, Column 19, Line 54, "processing system a graphics processing system" should read --processing system is a graphics processing system--.

Signed and Sealed this
Eighth Day of November, 2022

Katherine Kelly Vidal
*Director of the United States Patent and Trademark Office*